United States Patent

[11] 3,610,353

| [72] | Inventors | Simon J. Hocking<br>Laurium;<br>Gary L. Viegelahn, Lake Linden; James W.<br>Keranen, Laurium, all of Mich. |
|---|---|---|
| [21] | Appl. No. | 34,384 |
| [22] | Filed | May 4, 1970 |
| [45] | Patented | Oct. 5, 1971 |
| [73] | Assignee | Northern Technical Services, Inc.<br>Laurium, Mich. |

[54] FLEXIBLE SCALE PLATFORM
4 Claims, 2 Drawing Figs.

[52] U.S. Cl. ..................................................... 177/153,
  177/134
[51] Int. Cl. .................................................... G01g23/02,
  G01g 19/02

[50] Field of Search ....................................... 177/134–136,
  141, 139, 146, 151–153

[56] References Cited
UNITED STATES PATENTS
| 1,254,335 | 1/1918 | Malensheck ................. | 177/141 X |
| 2,020,307 | 11/1935 | Fitch ............................. | 177/141 X |

FOREIGN PATENTS
| 409,913 | 2/1925 | Germany ..................... | 177/152 |

Primary Examiner—Robert S. Ward, Jr.
Attorney—Glenn B. Morse

ABSTRACT: A scale platform is supported in no-load condition by at least one load-registry device. A plurality of abutments are distributed about an area below the platform, and are adapted to function as supports exclusively on deflection of the platform.

PATENTED OCT 5 1971

3,610,353

INVENTORS
Simon Hocking
Gary Viegelahn
BY James W. Keranen

*Glenn B. Moore*
ATTORNEY

FLEXIBLE SCALE PLATFORM

BACKGROUND OF THE INVENTION

Platform scales are used to register the weight of vehicles of all descriptions. State highway regulations specify the maximum axle loading on these vehicles, and official weighing stations are common sight along the main highways. Conventional construction of a platform scale usually involves a recess in a roadway within which a platform is supported on spaced load-registry devices which are integrated to read out the total weight supported by the platform. The surface of the platform is normally flush with the roadway to provide a continuous surface over which the vehicle may pass without substantial interruption.

This arrangement normally requires the platform to be sufficiently stiff to support the load of the vehicle, which will at some time be placed directly between the supporting load-registry devices. These conditions establish the stiffness requirement of the platform, resulting in a structure of very substantial weight and expense. The present invention vastly reduces the strength requirements of the platform for a given load-registry capacity.

SUMMARY OF THE INVENTION

The present invention reduces the strength requirement of the platform by providing a group of abutments that limit the deflection of the platform under load. The platform is supported in no-load condition by a load-registry device at least at one point. The adjacent abutments are preferably adjustable and have clearance under the platform in no-load condition, but function as supports when the platform deflects. In the preferred arrangement, the platform is supported on opposite sides by load-registry devices, with groups of adjustable jacks distributed to limit the deflection of the platform under all conditions to a degree that does not exceed the yield point of the platform structure.

DESCRIPTION OF THE PREFERRED EMBODIMENT

Figure 1:
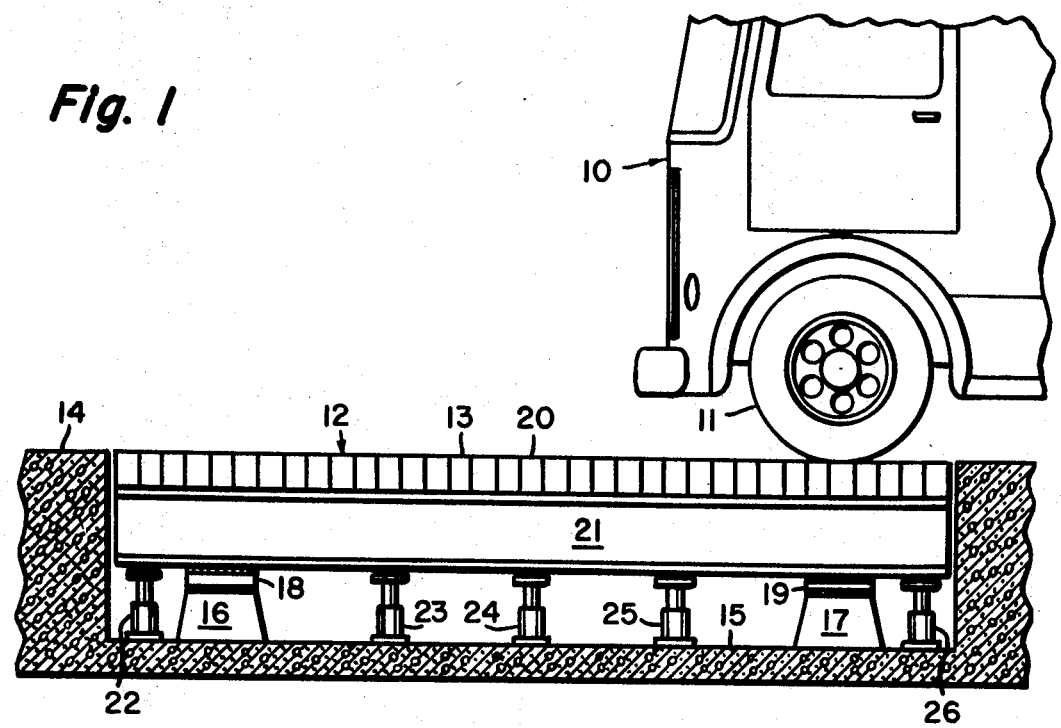
FIG. 1 is a sectional elevation showing a truck beginning to move across a platform installation embodying the present invention.

Referring to FIG. 1, the vehicle generally indicated at 10 is positioned with its front wheels 11 engaging the scale structure generally indicated at 12. The top surface 13 of the scale structure is coplanar with the roadway surface 14. The bottom 15 of a recess or pit provides a base for the support of the scale installation.

Figure 2:
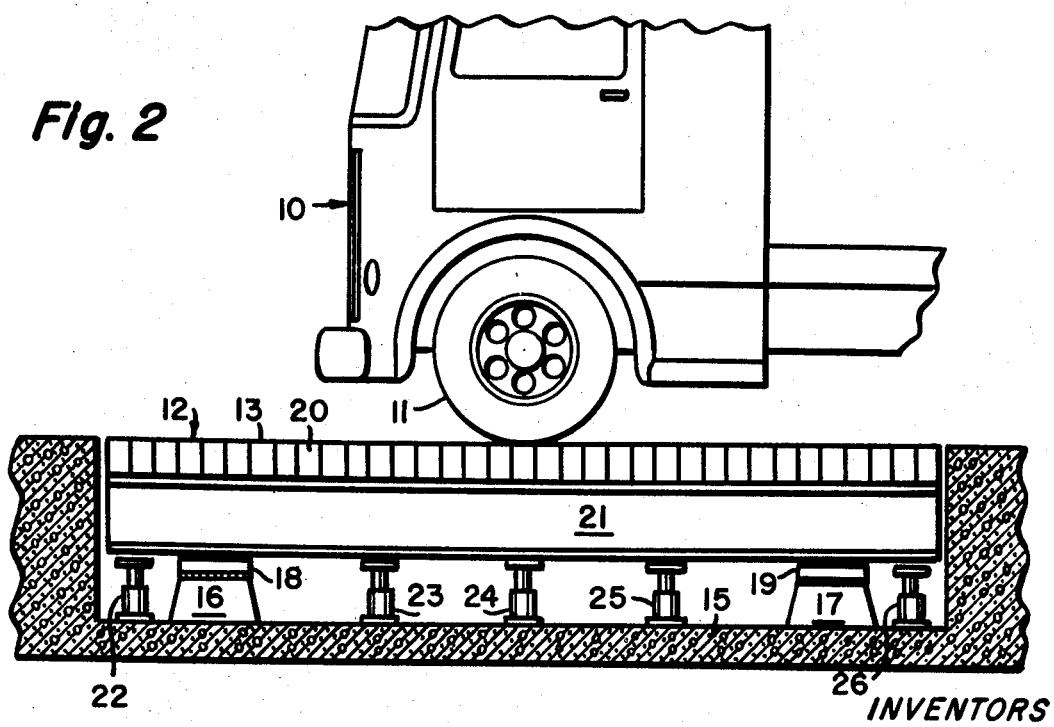
FIG. 2 illustrates the vehicle shown in FIG. 1 at a subsequent point in passing across the scale installation.

Fixed abutments as shown at 16 and 17 serve as pedestals for transferring forces from the load-registry devices 18 and 19 to the base 15. These devices may be of any conventional form. In the no-load condition (prior to the arrival of the truck 10), the entire platform structure, including the surface material 20 and the frame 21 constructed of steel beams, is supported exclusively by the load-registry devices 18 and 19. A group of adjustable jacks 22–26 are disposed underneath the platform structure to limit the deflection of the steel frame 21 to a degree which will not exceed the yield point of that structure. These jacks are thus adjusted to provide clearance under the frame 21 in the no-load condition. The arrangement shown in FIG. 1 will normally be duplicated at opposite sides of the roadway, so that the condition shown in FIG. 1 will result in supporting the front axle loading of the vehicle by registry devices in the position of the device 19. As the wheels 11 move across the platform, a variety of conditions will progressively develop. FIG. 2 illustrates the intermediate position of the vehicle, in which the front wheels are directly in the middle of the distance between the load-registry devices. Normally, this condition would represent the maximum bending moment applied to the platform structure, but the stresses corresponding to this condition are eliminated by the presence of the jack 24. As soon as any substantial degree of deflection develops in the platform frame 21, the jack 24 will be engaged by the platform, and thus function as a support preventing further deflection and stress development. The jacks are adjusted so that they will only engage the platform when the wheels of the vehicle are in the area directly above.

The indications provided by the load-registry devices are read out by conventional recording devices (not shown), which form no part of the present invention. The devices 18 and 19 are preferably interrelated with their counterparts on the opposite side of the scale to provide the total axle load as the wheels of the vehicle pass directly over. Using two sets of these, as shown in the drawing, provides two positions in which the axle load of the vehicle is indicated. These can be used as a cross-check if desired. A corresponding effect without the cross-check may be obtained by the use of a single set of load-registry devices, with the adjacent adjustable abutments to provide clearance in the no-load condition.

We claim:

1. In combination with a supporting base, a scale assembly comprising:
    a flexible platform;
    at least one load-registry device interposed between said base and said platform in load-transferring relationship, and
    a plurality of abutments interposed between said base and said platform, those of said abutments which are adjacent to said load-registry device being adapted to support said platform exclusively on deflection of said platform.

2. An assembly as defined in claim 1, wherein said platform is supported in no-load condition by spaced load-registry devices.

3. An assembly as defined in claim 1, wherein the top of said platform is substantially coplanar with a roadway, and said base is provided by a recess in said roadway.

4. An assembly as defined in claim 1, wherein said abutments are adjustable jack devices supported by said base.